(12) United States Patent
Kang

(10) Patent No.: US 8,890,904 B2
(45) Date of Patent: Nov. 18, 2014

(54) WHITE BALANCE ADJUSTING METHOD

(75) Inventor: Chihtsung Kang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 312 days.

(21) Appl. No.: 13/381,352

(22) PCT Filed: Dec. 15, 2011

(86) PCT No.: PCT/CN2011/084045
§ 371 (c)(1),
(2), (4) Date: Dec. 28, 2011

(87) PCT Pub. No.: WO2013/086717
PCT Pub. Date: Jun. 20, 2013

(65) Prior Publication Data
US 2013/0155121 A1 Jun. 20, 2013

(30) Foreign Application Priority Data

Dec. 14, 2011 (CN) .......................... 2011 1 0418166

(51) Int. Cl.
*G09G 5/10* (2006.01)
*H04N 9/73* (2006.01)
(52) U.S. Cl.
CPC ... *G09G 5/10* (2013.01); *H04N 9/73* (2013.01)
USPC ....................................... 345/690; 348/223.1
(58) Field of Classification Search
None
See application file for complete search history.

(56) References Cited

U.S. PATENT DOCUMENTS

| 2006/0232685 | A1* | 10/2006 | Takemoto | 348/223.1 |
| 2008/0225055 | A1* | 9/2008 | Yu et al. | 345/600 |
| 2009/0066731 | A1* | 3/2009 | Kim et al. | 345/690 |
| 2010/0158359 | A1* | 6/2010 | Qiao | 382/164 |
| 2012/0001964 | A1* | 1/2012 | Masuda et al. | 345/690 |

OTHER PUBLICATIONS

Avago Technologies, "Reflective Color Sensing with Avago Technologies' RGB Sensor, White Paper," AV02-0172EN-Mar. 22, 2010, p. 1-10.*

* cited by examiner

*Primary Examiner* — Srilakshmi K Kumar
*Assistant Examiner* — Sardis Azongha

(57) ABSTRACT

The invention relates to a white balance adjusting method, which includes steps of: obtaining the maximum and minimum spectral tristimulus values $X_{max}, Y_{max}, Z_{max}$ and $X_0, Y_0, Z_0$ in a chromaticity coordinate system as well as spectral tristimulus values of each gray level for red, green and blue; converting the maximum spectral tristimulus values into maximum color stimulus values; converting the maximum color stimulus values into a hue and a chroma; computing intermediate spectral stimulus values $Y_1$ to $Y_{max-1}$ of Y; computing intermediate spectral stimulus values of X, Z; determining spectral tristimulus values of red, green, blue colors of a white field for each gray level and corresponding gray level numbers. The white balance adjusting method of this invention executes the white field adjustment by fixing the hue and the chroma of a white point for all gray levels based on brightness variance matching gray level index variance.

15 Claims, 1 Drawing Sheet

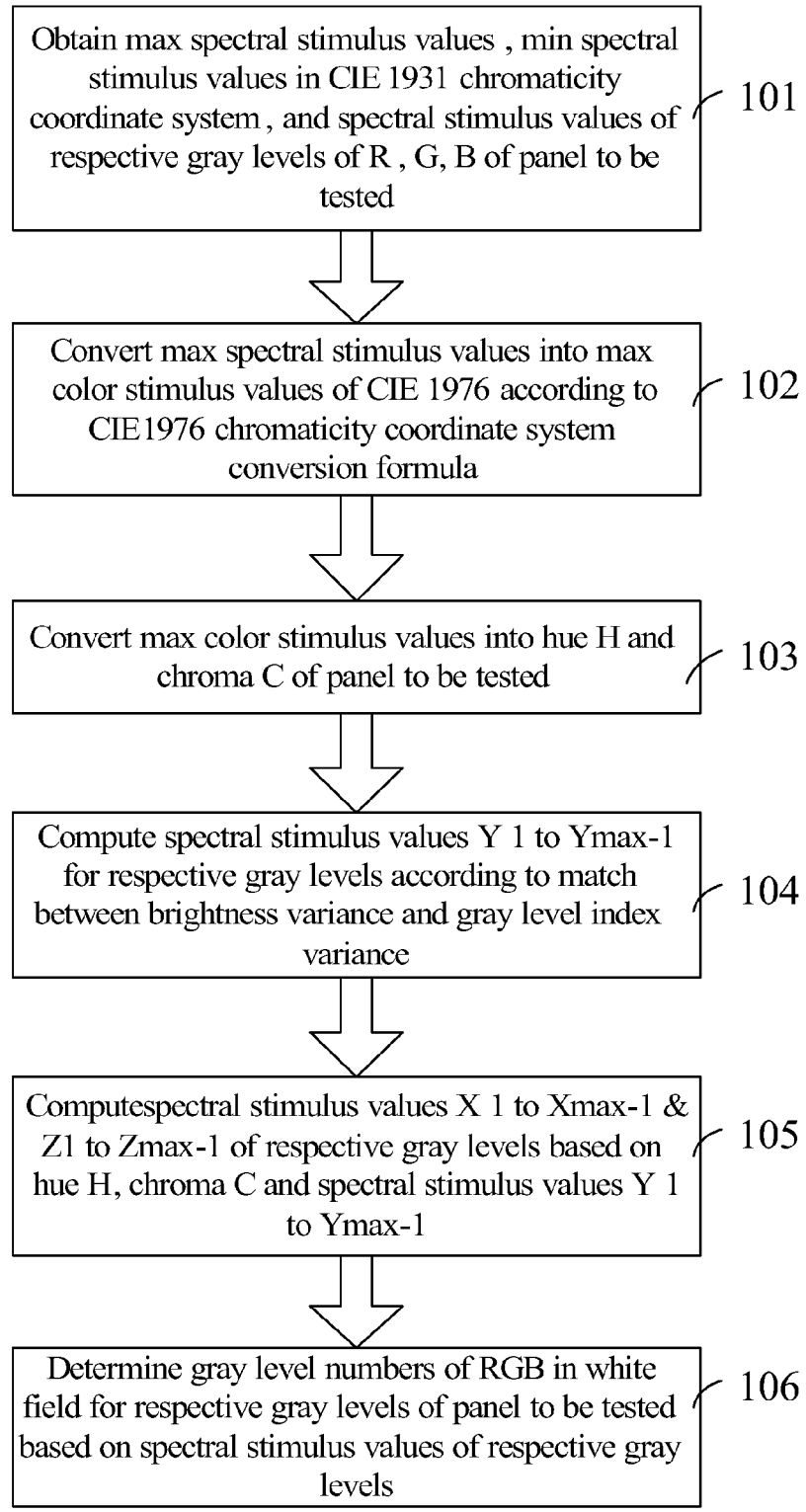

WHITE BALANCE ADJUSTING METHOD

TECHNICAL FIELD OF THE INVENTION

The present invention involves a field of parameter setting for a display device, more particularly a white balance adjusting method for a display device.

BACKGROUND OF THE INVENTION

White field chromaticity coordinates displayed by current display devices such as a liquid crystal display device, plasma display device and rear projection display device and the like are different from each other more or less due to the discrepancies among the displaying principles or hardware designs thereof. If a corresponding white balance adjustment is not executed to the white field chromaticity coordinate discrepancies of the display devices, there will be significant differences in the color display effect among different display devices. Accordingly, white balance tracing and corrections are usually executed during the manufacturing process of the display devices so that a color displayed by the respective display devices tends to be consistent.

Generally, the white balance tracing and correction technique is to make a white point mixed by three primary colors RGB of each gray level satisfy $Wx_n = Wx_{255}$, $Wy_n = Wy_{255}$, $n = 1.2 \ldots 255$ (where Wx and Wy are chroma values of CIE1931 chromaticity coordinate system, n is the gray level number) by setting spectral tristimulus values of the three primary colors RGB (i.e. red, green, blue) corresponding to each gray level. However, CIE1931 chromaticity coordinate system utilizes non-uniform color space coordinates and fails to reflect the stimulation of brightness to human eyes. The requirements of $Wx_n = Wx_{255}$, $W_{y_n} = Wy_{255}$, $n = 1.2 \ldots 255$ in CIE1931 chromaticity coordinate system fails to reach the requirement that the human eyes feel the brightness change while the same hue and saturation are maintained at the same time, so that it fails to make the human eyes feel the same chromatic stimulus.

Therefore, there is a need for a white balance adjustment method to solve the problem existing in the prior art.

SUMMARY OF THE INVENTION

An objective of the present invention is to provide a white balance adjusting method to solve the technical that the conventional white balance adjusting method fails to reach the requirement that the human eyes feel the brightness change while the same hue and saturation are maintained at the same time, so that it fails to make the human eyes feel the same chromatic stimulus, in the method, the adjustment is executed by making brightness variance match gray level index variance and keeping a hue and a chroma of a white point for each gray level to be constant.

In order to solve the above problem, the technical solution provided by the present invention is as follows:

The present invention relates to a white balance adjusting method, which comprises steps of: A. obtaining the maximum spectral tristimulus values $X_{max}$, $Y_{max}$ and $Z_{max}$ in CIE1931 chromaticity coordinate system for a panel to be tested, the minimum spectral tristimulus values $X_0$, $Y_0$ and $Z_0$ in CIE1931 chromaticity coordinate system for the panel to be tested, spectral tristimulus values $RX_m$, $RY_m$, $RZ_m$ of the respective gray levels of Red for the panel to be tested, spectral tristimulus values $GX_m$, $GY_m$, $GZ_m$ of the respective gray levels of Green for the panel to be tested, and spectral tristimulus values $BX_m$, $BY_m$, $BZ_m$ of the respective gray levels of Blue for the panel to be tested, where m is the gray level number, X, Y, Z are the spectral tristimulus values of the panel to be tested; B. converting the maximum spectral tristimulus values $X_{max}$, $Y_{max}$ and $Z_{max}$ into the maximum color stimulus values $L_{max}$, $a_{max}$ and $b_{max}$ in CIE1931 chromaticity coordinate system according to a conversion formula of CIE1931 chromaticity coordinate system, where L is psychological lightness, a, b indicate psychological chroma; C. converting the maximum color stimulus values $L_{max}$, $a_{max}$ and $b_{max}$ into a hue H and a chroma C of the panel to be tested; D. computing spectral stimulus values $Y_1$ to $Y_{max-1}$ for intermediate gray levels according to brightness variance matching gray level index variance and based on $Y_{max}$ and $Y_0$; E. computing spectral stimulus values $X_1$ to $X_{max-1}$ and $Z_1$ to $Z_{max-1}$ for intermediate gray levels according to the hue H, the chroma C and the spectral stimulus values $Y_1$ to $Y_{max-1}$ of the respective gray levels; F. determining spectral tristimulus values of the three colors RGB of a white field of the respective gray levels for the panel to be tested according to the spectral tristimulus values $X_0$ to $X_{max}$, $Y_0$ to $Y_{max}$ and $Z_0$ to $Z_{max}$ of the respective gray levels, and further obtaining gray level numbers of the three colors RGB in the white field of the respective gray levels;

The step B particularly comprises converting the maximum spectral tristimulus values $X_{max}$, $Y_{max}$ and $Z_{max}$ into the maximum color stimulus values $L_{max}$, $a_{max}$ and $b_{max}$ in CIE1931 chromaticity coordinate system according to the following formula:

$$L_{max} = 116 * f(Y_{max}/Y_s) - 16,$$

$$a_{max} = 500 * [f(X_{max}/X_s) - f(Y_{max}/Y_s)],$$

$$b_{max} = 200 * [f(Y_{max}/Y_s) - f(Z_{max}/Z_s)],$$

where Xs, Ys, Zs are spectral tristimulus values of a CIE standard illuminant, L is psychological lightness, a, b indicate psychological chroma;

The step E particularly comprises converting the hue H, the chroma C and the spectral stimulus values $Y_1$ to $Y_{max-1}$ of the respective gray levels into the spectral stimulus values $X_1$ to $X_{max-1}$ and $Z_1$ to $Z_{max-1}$ of the respective gray levels according to the following formula:

$$f(X_n/X_s) - f(Y_n/Y_s) = f(X_{max}/X_s) - f(Y_{max}/Y_s),$$

$$f(Y_n/Y_s) - f(Z_n/Z_s) = f(Y_{max}/Y_s) - f(Z_{max}/Z_s),$$

$$f(X_{n-1}/X_s) - f(Y_{n-1}/Y_s) = f(X_n/X_s) - f(Y_n/Y_s),$$

$$f(Y_{n-1}/Y_s) - f(Z_{n-1}/Z_s) = f(Y_n/Y_s) - f(Z_n/Z_s);$$

where a range of n is 1~(max−1), Xs, Ys, Zs are the spectral tristimulus values of the CIE standard illuminant;

the spectral tristimulus values of the CIE standard illuminant Xs=Ys=Zs=100.

The present invention further relates to a white balance adjusting method, which comprises steps of: A. obtaining the maximum spectral tristimulus values $X_{max}$, $Y_{max}$ and $Z_{max}$ in CIE1931 chromaticity coordinate system for a panel to be tested, the minimum spectral tristimulus values $X_0$, $Y_0$ and $Z_0$ in CIE1931 chromaticity coordinate system for the panel to be tested, spectral tristimulus values $RX_m$, $RY_m$, $RZ_m$ of the respective gray levels of Red for the panel to be tested, spectral tristimulus values $GX_m$, $GY_m$, $GZ_m$ of the respective gray levels of Green for the panel to be tested, and spectral tristimulus values $BX_m$, $BY_m$, $BZ_m$ of the respective gray levels of Blue for the panel to be tested, where m is the gray level number, X, Y, Z are the spectral tristimulus values of the panel to be tested; B. converting the maximum spectral tristimulus values $X_{max}$, $Y_{max}$ and $Z_{max}$ into the maximum color stimulus values $L_{max}$, $a_{max}$ and $b_{max}$ in CIE1976 chromaticity coordinate system according to a conversion formula of CIE1976 chromaticity coordinate system, where L is psychological lightness, a, b indicate psychological chroma; C. converting the maximum color stimulus values $L_{max}$, $a_{max}$ and $b_{max}$ into a hue H and a chroma C of the panel to be tested; D. computing spectral stimulus values $Y_1$ to $Y_{max-1}$ for intermediate gray levels according to brightness variance matching gray level index variance and based on $Y_{max}$ and $Y_0$; E. computing spectral stimulus values $X_1$ to $X_{max-1}$ and $Z_1$ to $Z_{max-1}$ for intermediate gray levels according to the hue H, the chroma C and the spectral stimulus values $Y_1$ to $Y_{max-1}$ of the respective gray levels; F. determining spectral tristimulus values of the three colors RGB of a white field of the respective gray levels for the panel to be tested according to the spectral tristimulus values $X_0$ to $X_{max}$, $Y_0$ to $Y_{max}$ and $Z_0$ to $Z_{max}$ of the respective gray levels, and further obtaining gray level numbers of the three colors RGB in the white field of the respective gray levels;

In the white balance adjusting method in accordance with the present invention, the step B particularly comprises converting the maximum spectral tristimulus values $X_{max}$, $Y_{max}$ and $Z_{max}$ into the maximum color stimulus values $L_{max}$, $a_{max}$ and $b_{max}$ in CIE1976 chromaticity coordinate system according to the following formula:

$$L_{max}=116*f(Y_{max}/Y_s)-16,$$

$$a_{max}=500*[f(X_{max}/X_s)-f(Y_{max}/Y_s)],$$

$$b_{max}=200*[f(Y_{max}/Y_s)-f(Z_{max}/Z_s)],$$

where Xs, Ys, Zs are spectral tristimulus values of a CIE standard illuminant, L is psychological lightness, a, b indicate psychological chroma.

In the white balance adjusting method in accordance with the present invention,
when $(X_{max}/X_s)>0.008856$, $f(X_{max}/X_s)=(X_{max}/X_s)^{1/3}$;
when $(X_{max}/X_s) \leq 0.008856$, $f(X_{max}/X_s)=7.787*(X_{max}/X_s)+16/116$.

In the white balance adjusting method in accordance with the present invention, the step C particularly comprises converting the maximum color stimulus values $L_{max}$, $a_{max}$ and $b_{max}$ into a hue H and a chroma C of the panel to be tested according to the following formula:

$$H=1/[\tan(b_{max}/a_{max})],$$

$$C=[(a_{max})^2+(b_{max})^2]^{1/2}.$$

In the white balance adjusting method in accordance with the present invention, the step D particularly comprises computing spectral stimulus values $Y_1$ to $Y_{max-1}$ for the respective gray levels according to $Y_{max}$ and $Y_0$ based on the following formula:

$$Y_t=[(t/\max)^{E}*(Y_{max}-Y_0)]+Y_0,$$

where E is a gamma value, a range of the gamma value is 2.0~2.4, and a range of t is 1~(max−1).

In the white balance adjusting method in accordance with the present invention, the gamma value is 2.2.

In the white balance adjusting method in accordance with the present invention, the step E particularly comprises converting the hue H, the chroma C and the spectral stimulus values $Y_1$ to $Y_{max-1}$ of the respective gray levels into the spectral stimulus values $X_1$ to $X_{max-1}$ and $Z_1$ to $Z_{max-1}$ of the respective gray levels according to the following formula:

$$f(X_n/X_s)-f(Y_n/Y_s)=f(X_{max}/X_s)-f(Y_{max}/Y_s),$$

$$f(Y_n/Y_s)-f(Z_n/Z_s)=f(Y_{max}/Y_s)-f(Z_{max}/Z_s),$$

$$f(X_{n-1}/X_s)-f(Y_{n-1}/Y_s)=f(X_n/X_s)-f(Y_n/Y_s),$$

$$f(Y_{n-1}/Y_s)-f(Z_{n-1}/Z_s)=f(Y_n/Y_s)-f(Z_n/Z_s);$$

where a range of n is 1~(max−1), Xs, Ys, Zs are the spectral tristimulus values of the CIE standard illuminant.

In the white balance adjusting method in accordance with the present invention,
when $(X_n/X_s)>0.008856$, $f(X_n/X_s)=(X_n/X_s)^{1/3}$,
when $(Z_n/Z_s)>0.008856$, $f(Z_n/Z_s)=(Z_n/Z_s)^{1/3}$,
when $(X_n/X_s) \leq 0.008856$, $f(X_n/X_s)=7.787*(X_n/X_s)+16/116$,
when $(Z_n/Z_s) \leq 0.008856$, $f(Z_n/Z_s)=7.787*(Z_n/Z_s)+16/116$.

In the white balance adjusting method in accordance with the present invention, the spectral tristimulus values of the CIE standard illuminant $X_s=Y_s=Z_s=100$.

In the white balance adjusting method in accordance with the present invention, the step F particularly comprises determining the spectral tristimulus values $RX_P$, $RY_P$, $RZ_P$, $GX_Q$, $GY_Q$, $GZ_Q$, $BX_S$, $BY_S$, $BZ_S$ of the three colors RGB of the white field of the respective gray levels for the panel to be tested according to the spectral tristimulus values $X_0$ to $X_{max}$, $Y_0$ to $Y_{max}$ and $Z_0$ to $Z_{max}$ of the respective gray levels and further obtaining the gray level numbers P, Q, S of the three colors RGB in the white field of the respective gray levels based on the following formula:

$$X_n=RX_P+GX_Q+BX_S,$$

$$Y_n=RY_P+GY_Q+BY_S,$$

$$Z_n=RZ_P+GZ_Q+BZ_S,$$

where ranges of n, P, Q, S are 0~max.

Advantageous effects reached by implementing the white balance adjusting method of the present invention are as follows: in the white balance adjusting method of the present invention, the white field is adjusted under conditions where the brightness variance matches the gray level index variance and the hue and chroma of the white point for all the gray levels are fixed, so the technical problem that the conventional white balance adjusting method fails to maintain the hue and chroma to be the same when the human eyes feel the brightness change is avoided.

For a better understanding of the aforementioned content of the present invention, a preferred embodiment is described in detail in conjunction with the appending FIGURE as follows:

BRIEF DESCRIPTION OF THE DRAWINGS

FIG. 1. is a flow chart of a white balance adjusting method in accordance with a preferred embodiment of the present invention.

DETAILED DESCRIPTION OF THE INVENTION

The respective embodiments will be described with reference to the appending drawings as follows, and they are specific embodiments for exemplifying that the present invention is able to be put into practice.

The present invention involves a white balance adjusting method, FIG. 1. is a flow chart of the white balance adjusting method in accordance with a preferred embodiment of the present invention. The white balance adjusting method starts at:

Step 101. obtaining the maximum spectral tristimulus values $X_{max}$, $Y_{max}$ and $Z_{max}$ in CIE1931 chromaticity coordinate system for a panel to be tested, the minimum spectral tristimulus values $X_0$, $Y_0$ and $Z_0$ in CIE1931 chromaticity coordinate system for the panel to be tested, spectral tristimulus values $RX_m$, $RY_m$, $RZ_m$ of the respective gray levels of Red (R) for the panel to be tested, spectral tristimulus values $GX_m$, $GY_m$, $GZ_m$ of the respective gray levels of Green (G) for the panel to be tested, and spectral tristimulus values $BX_m$, $BY_m$, $BZ_m$ of the respective gray levels of Blue (B) for the panel to be tested, where m is the gray level number, X, Y, Z are the spectral tristimulus values of the panel to be tested.

Step 102. converting the maximum spectral tristimulus values $X_{max}$, $Y_{max}$ and $Z_{max}$ into the maximum color stimulus values $L_{max}$, $a_{max}$ and $b_{max}$ in CIE1931 chromaticity coordinate system according to a conversion formula of CIE1931 chromaticity coordinate system, where L is psychological lightness, a, b indicate psychological chroma.

Step 103. converting the maximum color stimulus values $L_{max}$, $a_{max}$ and $b_{max}$ into a hue H and a chroma C of the panel to be tested.

Step 104. computing spectral stimulus values $Y_1$ to $Y_{max-1}$ for intermediate gray levels based on $Y_{max}$ and $Y_0$ according to the principle that brightness variance matches gray level index variance;

Step 105. computing spectral stimulus values $X_1$ to $X_{max-1}$ and $Z_1$ to $Z_{max-1}$ for intermediate gray levels according to the hue H, the chroma C and the spectral stimulus values $Y_1$ to $Y_{max-1}$ of the respective gray levels;

Step 106. determining spectral tristimulus values of the three colors RGB of a white field of the respective gray levels for the panel to be tested from the spectral tristimulus values of the respective gray levels for the three colors RGB measured in step 101 according to the spectral tristimulus values $X_0$ to $X_{max}$, $Y_0$ to $Y_{max}$ and $Z_0$ to $Z_{max}$ of the respective gray levels, and further obtaining gray level numbers of the three colors RGB in the white field of the respective gray levels.

The respective steps will be described in detail as follows by taking a case of 256 gray levels (i.e. max=255) as an example:

Step 101 particularly comprises obtaining the maximum spectral tristimulus values $X_{255}$, $Y_{255}$ and $Z_{255}$, the minimum spectral tristimulus values $X_0$, $Y_0$ and $Z_0$ for the panel to be tested by measuring, then measuring spectral tristimulus values $RX_m$, $RY_m$, $RZ_m$ of the respective gray levels of Red, spectral tristimulus values $GX_m$, $GY_m$, $GZ_m$ of the respective gray levels of Green, and spectral tristimulus values $BX_m$, $BY_m$, $BZ_m$ of the respective gray levels of Blue of the three colors RGB for the panel to be tested, where a range of m is 0-255.

Step 102 particularly comprises converting the maximum spectral tristimulus values $X_{255}$, $Y_{255}$ and $Z_{255}$ into the maximum color stimulus values $L_{255}$, $a_{255}$ and $b_{255}$ in CIE1976 chromaticity coordinate system according to a the following formula;

$$L_{255}=116*f(Y_{255}/Y_s)-16;$$

$$a_{255}=500*[f(X_{255}/X_s)-f(Y_{255}/Y_s)];$$

$$b_{255}=200*[f(Y_{255}/Y_s)-f(Z_{255}/Z_s)];$$

$$Xs=Ys=Zs=100;$$

when $(X_{255})>0.008856$, $f(X_{255})=(X_{255})^{1/3}$;
when $(X_{255})\leq 0.008856$, $f(X_{255})=7.787*(X_{255})+16/116$;

where Xs, Ys, Zs are spectral tristimulus values of a CIE standard illuminant, L is psychological lightness, a, b indicate psychological chroma.

Step 103 particularly comprises converting $L_{255}$, $a_{255}$ and $b_{255}$ into the hue H and the chroma C (the hue H and the chroma C corresponds to the spectral tristimulus values $X_{255}$, $Y_{255}$ and $Z_{255}$) of the panel to be tested according to the following formula;

$$H=1/[\tan(b_{255}/a_{255})]$$

$$C=[(a_{255})^2+(b_{255})^2]^{1/2}.$$

Step 104 particularly comprises computing spectral stimulus values $Y_1$ to $Y_{254}$ for intermediate gray levels based on $Y_{255}$ and $Y_0$ according to a formula which indicates that brightness variance matching gray level index variance;

$$Y_t=[(t/255)^E*(Y_{255}-Y_0)]+Y_0,$$

where E is the gamma value, the range thereof is 2.0~2.4, preferably 2.2, and a range of t is 1~254.

Step 105 particularly comprises, converting the hue H, the chroma C and the spectral stimulus values $Y_1$ to $Y_{254}$ of the respective gray levels into the spectral stimulus values $X_1$ to $X_{254}$ and $Z_1$ to $Z_{254}$ for intermediate gray levels;

Since the hue and the chroma are fixed for different gray levels, the variables a, b should also be fixed for different gray levels. Thus, $$a_n=a_{n-1}=a_{255}, b_n=b_{n-1}=b_{255},$$

And, $$a_n=500*[f(X_n/X_s)-f(Y_n/Y_s)]; b_n=200*[f(Y_n/Y_s)-f(Z_n/Z_s)];$$

$$a_{n-1}=500*[f(X_{n-1}/X_s)-f(Y_{n-1}/Y_s)]; b_{n-1}=200*[f(Y_{n-1}/Y_s)-f(Z_{n-1}/Z_s)];$$

$$a_{255}=500*[f(X_{255}/X_s)-f(Y_{255}/Y_s)]; b_{255}=200*[f(Y_{255}/Y_s)-f(Z_{255}/Z_s)];$$

Thus, $$f(X_n/X_s)-f(Y_n/Y_s)=f(X_{max}/X_s)-f(Y_{max}/Y_s);$$

$$f(Y_n/Y_s)-f(Z_n/Z_s)=f(Y_{max}/Y_s)-f(Z_{max}/Z_s);$$

$$f(X_{n-1}/X_s)-f(Y_{n-1}N_s)=f(X_n/X_s)-f(Y_n/Y_s);$$

$$f(Y_{n-1}/Y_s)-f(Z_{n-1}/Z_s)=f(Y_n/Y_s)-f(Z_n/Z_s);$$

when $(X_1/X_s)>0.008856$, $f(X_n/X_s)=(X_n/X_s)^{1/3}$;
when $(Z_n/Z_s)>0.008856$, $f(Z_n/Z_s)=(Z_n/Z_s)^{1/3}$;
when $(X_n/X_s)\leq 0.008856$, $f(X_n/X_s)=7.787*(X_n/X_s)+16/116$,
when $(Z_n/Z_s)\leq 0.008856$, $f(Z_n/Z_s)=7.787*(Z_n/Z_s)+16/116$.
$X_s=Y_s=Z_s=100$, a range of n is 1~254;

where $X_s$, $Y_s$, $Z_s$ are the spectral tristimulus values of the CIE standard illuminant.

Step 106 particularly comprises: the 256 spectral tristimulus values of the respective 256 gray levels for the three colors RGB have been obtained in step 101, the spectral tristimulus values $X_0$ to $X_{255}$, $Y_0$ to $Y_{255}$ and $Z_0$ to $Z_{255}$ of the respective gray levels have been obtained in step 105, thereby determining spectral tristimulus values $RX_P$, $RY_P$, $RZ_P$, $GX_Q$, $GY_Q$, $GZ_Q$, $BX_S$, $BY_S$, $BZ_S$ of the three colors RGB of a white field of the respective gray levels for the panel to be tested, the spectral tristimulus values for the RGB have been measured in step 101. Assumed that the white field of a gray level n is composed of a red light having the spectral tristimulus values $RX_P$, $RY_P$, $RZ_P$, a green light having the spectral tristimulus values $GX_Q$, $GY_Q$, $GZ_Q$, and a blue light having the spectral tristimulus values $BX_S$, $BY_S$, $BZ_S$, then the gray level numbers P, Q, S of the three colors RGB in the white field of each gray level can be determined according to the following formula:

$$X_n = RX_P + GX_Q + BX_S;$$

$$Y_n = RY_P + GY_Q + BY_S;$$

$$Z_n = RZ_P + GZ_Q + BZ_S;$$

where ranges of n, P, Q, S are 0~255.

In the white balance adjusting method of the present invention, the white field is adjusted under conditions where the brightness variance matches the gray level index variance and the hue and chroma of the white point for all the gray levels are fixed, so the technical problem that the conventional white balance adjusting method fails to maintain the hue and chroma to be the same when the human eyes feel the brightness change is effectively solved.

To sum up, the present invention has been disclosed as the preferred embodiments above, however, the above preferred embodiments are not described for limiting the present invention, various modifications, alterations and improvements can be made by persons skilled in this art without departing from the spirits and principles of the present invention, and therefore the protection scope of claims of the present invention is based on the range defined by the claims.

What is claimed is:

1. A white balance adjusting method, comprising steps of:
   A. obtaining maximum spectral tristimulus values $X_{max}$, $Y_{max}$ and $Z_{max}$ in CIE1931 chromaticity coordinate system for a panel to be tested, minimum spectral tristimulus values $X_0$, $Y_0$ and $Z_0$ in CIE1931 chromaticity coordinate system for the panel to be tested, spectral tristimulus values $RX_m$, $RY_m$, $RZ_m$ of respective gray levels of a red color for the panel to be tested, spectral tristimulus values $GX_m$, $GY_m$, $GZ_m$ of the respective gray levels of a green color for the panel to be tested, and spectral tristimulus values $BX_m$, $BY_m$, $BZ_m$ of the respective gray levels of a blue color for the panel to be tested, where m is a gray level number, X, Y, Z are the spectral tristimulus values of the panel to be tested;
   B. converting the maximum spectral tristimulus values $X_{max}$, $Y_{max}$ and $Z_{max}$ into maximum color stimulus values $L_{max}$, $a_{max}$ and $b_{max}$ in CIE1976 chromaticity coordinate system according to a conversion formula of CIE1976 chromaticity coordinate system, where L is a psychological lightness, a, b indicate a psychological chroma;
   C. converting the maximum color stimulus values $L_{max}$, $a_{max}$ and $b_{max}$ into a hue H and a chroma C of the panel to be tested;
   D. computing spectral stimulus values $Y_1$ to $Y_{max-1}$ for intermediate gray levels according to brightness variance matching gray level index variance and based on $Y_{max}$ and $Y_0$;
   E. computing spectral stimulus values $X_1$ to $X_{max-1}$ and $Z_1$ to $Z_{max-1}$ for the intermediate gray levels according to the hue H, the chroma C and the spectral stimulus values $Y_1$ to $Y_{max-1}$ of the respective gray levels;
   F. determining spectral tristimulus values of the three colors red, green and blue of a white field of the respective gray levels for the panel to be tested according to the spectral tristimulus values $X_0$ to $X_{max}$, $Y_0$ to $Y_{max}$ and $Z_0$ to $Z_{max}$ of the respective gray levels, and further obtaining gray level numbers of the three colors red, green and blue in the white field of the respective gray levels;

the step B particularly comprising converting the maximum spectral tristimulus values $X_{max}$, $Y_{max}$ and $Z_{max}$ into the maximum color stimulus values $L_{max}$, $a_{max}$ and $b_{max}$ in CIE1976 chromaticity coordinate system according to the following formula:

$$L_{max} = 116 * f(Y_{max}/Y_s) - 16,$$

$$a_{max} = 500 * [f(X_{max}/X_s) - f(Y_{max}/Y_s)],$$

$$b_{max} = 200 * [f(Y_{max}/Y_s) - f(Z_{max}/Z_s)],$$

where Xs, Ys, Zs are spectral tristimulus values of a CIE standard illuminant, L is the psychological lightness, a, b indicate the psychological chroma;

the step E particularly comprising converting the hue H, the chroma C and the spectral stimulus values $Y_1$ to $Y_{max-1}$ of the respective gray levels into the spectral stimulus values $X_1$ to $X_{max-1}$ and $Z_1$ to $Z_{max-1}$ of the respective gray levels according to the following formula:

$$f(X_n/X_s) - f(Y_n/Y_s) = f(X_{max}/X_s) - f(Y_{max}/Y_s),$$

$$f(Y_n/Y_s) - f(Z_n/Z_s) = f(Y_{max}/Y_s) - f(Z_{max}/Z_s),$$

$$f(X_{n-1}/X_s) - f(Y_{n-1}/Y_s) = f(X_n/X_s) - f(Y_n/Y_s),$$

$$f(Y_{n-1}/Y_s) - f(Z_{n-1}/Z_s) = f(Y_n/Y_s) - f(Z_n/Z_s);$$

where a range of n is 1~(max−1), Xs, Ys, Zs are the spectral tristimulus values of the CIE standard illuminant;

the spectral tristimulus values of the CIE standard illuminant Xs=Ys=Zs=100.

2. The white balance adjusting method according to claim 1, characterized in that:
   when $(X_{max}/X_s) > 0.008856$, $f(X_{max}/X_s) = (X_{max}/X_s)1/3$;
   when $(X_{max}/X_s) \le 0.008856$, $f(X_{max}/X_s) = 7.787 * (X_{max}/X_s) + 16/116$.

3. The white balance adjusting method according to claim 1, characterized in that:
   the step C particularly comprises converting the maximum color stimulus values $L_{max}$, $a_{max}$ and $b_{max}$ into the hue H and the chroma C of the panel to be tested according to the following formula:

$$H = 1/[\tan(b_{max}/a_{max})],$$

$$C = [(a_{max})2 + (b_{max})2]1/2.$$

4. The white balance adjusting method according to claim 1, characterized in that:
   the step D particularly comprises computing the spectral stimulus values $Y_1$ to $Y_{max-1}$ for the respective gray levels according to $Y_{max}$ and $Y_0$ based on the following formula:

$$Y_t = [(t/\max)^E * (Y_{max} - Y_0)] + Y_0,$$

where E is a gamma value, a range of the gamma value is 2.0~2.4, and a range of t is 1~(max−1).

5. The white balance adjusting method according to claim 4 characterized in that the gamma value is 2.2.

6. The white balance adjusting method according to claim 1, characterized in that:
   when $(X_n/X_s) > 0.008856$, $f(X_n/X_s) = (X_n/X_s)^{1/3}$,
   when $(Z_n/Z_s) > 0.008856$, $f(Z_n/Z_s) = (Z_n/Z_s)^{1/3}$,
   when $(X_n/X_s) \le 0.008856$, $f(X_n/X_s) = 7.787 * (X_n/X_s) + 16/116$,
   when $(Z_n/Z_s) \le 0.008856$, $f(Z_n/Z_s) = 7.787 * (Z_n/Z_s) + 16/116$.

7. The white balance adjusting method according to claim 1, characterized in that:
   the step F particularly comprises determining the spectral tristimulus values $RX_P$, $RY_P$, $RZ_P$, $GX_Q$, $GY_Q$, $GZ_Q$, $BX_S$, $BY_S$, $BZ_S$ of the three colors red, green and blue of the white field of the respective gray levels for the panel to be tested according to the spectral tristimulus values $X_0$ to $X_{max}$, $Y_0$ to $Y_{max}$ and $Z_0$ to $Z_{max}$ of the respective gray levels and further obtaining the gray level numbers P, Q, S of the three colors red, green and blue in the white field of the respective gray levels based on the following formula:

$$X_n = RX_P + GX_Q + BX_S,$$

$$Y_n = RY_P + GY_Q + BY_S,$$

$$Z_n = RZ_P + GZ_Q + BZ_S,$$

where ranges of n, P, Q, S are 0~max.

8. A white balance adjusting method, comprising steps of:

A. obtaining maximum spectral tristimulus values $X_{max}$, $Y_{max}$ and $Z_{max}$ in CIE1931 chromaticity coordinate system for a panel to be tested, minimum spectral tristimulus values $X_0$, $Y_0$ and $Z_0$ in CIE1931 chromaticity coordinate system for the panel to be tested, spectral tristimulus values $RX_m$, $RY_m$, $RZ_m$, of respective gray levels of a red color for the panel to be tested, spectral tristimulus values $GX_m$, $GY_m$, $GZ_m$, of the respective gray levels of a green for the panel to be tested, and spectral tristimulus values $BX_m$, $BY_m$, $BZ_m$ of the respective gray levels of a blue for the panel to be tested, where m is a gray level number, X, Y, Z are the spectral tristimulus values of the panel to be tested;

B. converting the maximum spectral tristimulus values $X_{max}$, $Y_{max}$ and $Z_{max}$ into maximum color stimulus values $L_{max}$, $a_{max}$ and $b_{max}$ in CIE1976 chromaticity coordinate system according to a conversion formula of CIE1976 chromaticity coordinate system, where L is a psychological lightness, a, b indicate a psychological chroma;

C. converting the maximum color stimulus values $L_{max}$, $a_{max}$ and $b_{max}$ into a hue H and a chroma C of the panel to be tested;

D. computing spectral stimulus values $Y_1$ to $Y_{max-1}$ for intermediate gray levels according to brightness variance matching gray level index variance and based on $Y_{max}$ and $Y_0$;

E. computing spectral stimulus values $X_1$ to $X_{max-1}$ and $Z_1$ to $Z_{max-1}$ for the intermediate gray levels according to the hue H, the chroma C and the spectral stimulus values $Y_1$ to $Y_{max-1}$ of the respective gray levels;

F. determining spectral tristimulus values of the three colors RGB of a white field of the respective gray levels for the panel to be tested according to the spectral tristimulus values $X_0$ to $X_{max}$, $Y_0$ to $Y_{max}$ and $Z_0$ to $Z_{max}$ of the respective gray levels, and further obtaining gray level numbers of the three colors red, green and blue in the white field of the respective gray levels;

the step E particularly comprises converting the hue H, the chroma C, and the spectral stimulus values $Y_1$ to $Y_{max-1}$ of the respective gray levels into the spectral stimulus values $X_1$ to $X_{max-1}$ and $Z_1$ to $Z_{max-1}$ of the respective gray levels according to the following formula:

$$f(X_n/X_s) - f(Y_n/Y_s) = f(X_{max}/X_s) - f(Y_{max}/Y_s),$$

$$f(X_{n-1}/X_s) - f(Y_{n-1}/Y_s) = f(X_n/X_s) - f(Y_n/Y_s),$$

$$f(Y_{n-1}/Y_s) - f(Z_{n-1}/Z_s) = f(Y_{max}/Y_s) - f(Z_{max}/Z_s),$$

$$f(Y_{n-1}/Y_s) - f(Z_{n-1}/Z_s) = f(Y_n/Y_s) - f(Z_n/Z_s);$$

where a range of n is 1~(max−1), Xs, Ys, Zs are the spectral tristimulus values of the CIE standard illuminant.

9. The white balance adjusting method according to claim 8, characterized in that:

the step B particularly comprises converting the maximum spectral tristimulus values $X_{max}$, $Y_{max}$ and $Z_{max}$ into the maximum color stimulus values $L_{max}$, $a_{max}$ and $b_{max}$ in CIE1976 chromaticity coordinate system according to the following formula:

$$L_{max} = 116 * f(Y_{max}/Y_s) - 16,$$

$$a_{max} = 500 * [f(X_{max}/X_s) - f(Y_{max}/Y_s)],$$

$$b_{max} = 200 * [f(Y_{max}/Y_s) - f(Z_{max}/Z_s)],$$

where Xs, Ys, Zs are spectral tristimulus values of a CIE standard illuminant, L is the psychological lightness, a, b indicate the psychological chroma.

10. The white balance adjusting method according to claim 9, characterized in that:

when $(X_{max}/X_s) > 0.008856$, $f(X_{max}/X_s) = (X_{max}/X_s)^{1/3}$;
when $(X_{max}/X_s) \leq 0.008856$, $f(X_{max}/X_s) = 7.787 * (X_{max}/X_s) + 16/116$.

11. The white balance adjusting method according to claim 8, characterized in that the step C particularly comprises converting the maximum color stimulus values $L_{max}$, $a_{max}$ and $b_{max}$ into the hue H and the chroma C of the panel to be tested according to the following formula:

$$H = 1/[\tan(b_{max}/a_{max})],$$

$$C = [(a_{max})^2 + (b_{max})^2]^{1/2}.$$

12. The white balance adjusting method according to claim 8, characterized in that the step D particularly comprises computing the spectral stimulus values $Y_1$ to $Y_{max-1}$ for the respective gray levels according to $Y_{max}$ and $Y_0$ based on the following formula:

$$Y_t = [(t/\max)^{E} * (Y_{max} - Y_0)] + Y_0,$$

where E is a gamma value, a range of the gamma value is 2.0~2.4, and a range of t is 1~(max−1).

13. The white balance adjusting method according to claim 12 characterized in that the gamma value is 2.2.

14. The white balance adjusting method according to claim 8, characterized in that:

when $(X_n/X_s) > 0.008856$, $f(X_n/X_s) = (X_n/X_s)^{1/3}$,
when $(Z_n/Z_s) > 0.008856$, $f(Z_n/Z_s) = (Z_n/Z_s)^{1/3}$,
when $(X_n/X_s) \leq 0.008856$, $f(X_n/X_s) = 7.787 * (X_n/X_s) + 16/116$,
when $(Z_n/Z_s) \leq 0.008856$, $f(Z_n/Z_s) = 7.787 * (Z_n/Z_s) + 16/116$.

15. The white balance adjusting method according to claim 8, characterized in that the step F particularly comprises determining the spectral tristimulus values $RX_P$, $RY_P$, $RZ_P$, $GX_Q$, $GY_Q$, $GZ_Q$, $BX_S$, $BY_S$, $BZ_S$ of the three colors red, green and blue of the white field of the respective gray levels for the panel to be tested according to the spectral tristimulus values $X_0$ to $X_{max}$, $Y_0$ to $Y_{max}$ and $Z_0$ to $Z_{max}$ of the respective gray levels and further obtaining the gray level numbers P, Q, S of the three colors red, green and blue in the white field of the respective gray levels based on the following formula:

$$X_n = RX_P + GX_Q + BX_S,$$

$$Y_n = RY_P + GY_Q + BY_S,$$

$$Z_n = RZ_P + GZ_Q + BZ_S,$$

where ranges of n, P, Q, S are 0~max.

* * * * *